A. R. SILVER & E. W. FAWCETT.
Clamps.

No. 150,900.                 Patented May 12, 1874.

UNITED STATES PATENT OFFICE.

ALBERT R. SILVER AND EDWARD W. FAWCETT, OF SALEM, OHIO; SAID FAWCETT ASSIGNOR TO JOHN DEMING, OF SAME PLACE.

IMPROVEMENT IN CLAMPS.

Specification forming part of Letters Patent No. 150,900, dated May 12, 1874; application filed April 7, 1874.

*To all whom it may concern:*

Be it known that we, A. R. SILVER and E. W. FAWCETT, of Salem, county of Columbiana and State of Ohio, have invented certain new and useful Improvements in Clamps, of which the following is a specification:

Our invention relates to clamps used for fastening material to a work-bench, or for any other purposes desired, and has for its object the easy adjustment of the clamp to irregular or beveled surfaces, and also to quickly release the clamp. To this end the nature of our invention consists in the construction of a universally-jointed head or jaw upon the end of the screw, and upon the frame directly opposite the screw. It also consists in the construction of a movable spring-nut, and in the combination of parts, as will be hereinafter more fully set forth.

In order to enable others skilled in the art to which our invention appertains to make and use the same, we will now proceed to describe its construction and operation, referring to the annexed drawing, in which—

Figure 1:
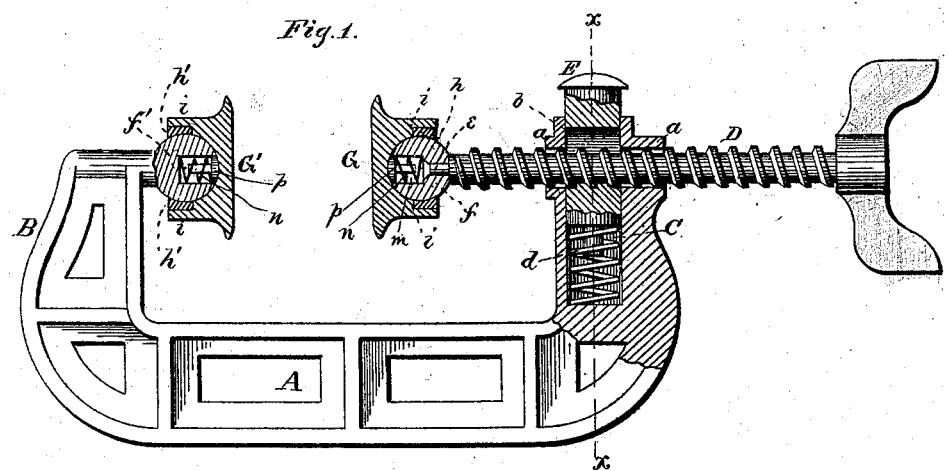
Figure 3:
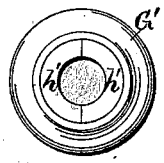
Figure 2:
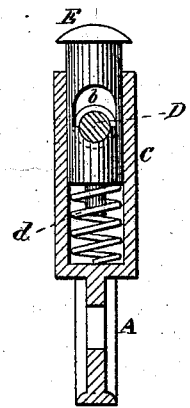

Figure 1 is a side elevation of our clamp, showing the heads or jaws in section. Fig. 2 is a section through the line $x\ x$, Fig. 1; and Fig. 3 is an end view of the universally-jointed head or jaw.

A represents the frame of the clamp, constructed in any suitable manner, so as to have one arm, B, to pass over, and another arm, C, to pass under, the articles to be clamped. The arm or part C of the frame is made in the form of, or contains, a hollow tube, open at its outer end and closed at the inner end. The tube C is, near the outer end, on the upper and lower sides, provided with tubular projections $a\ a$, corresponding with each other, and forming a passage for the vertical screw D. This screw passes through an elongated slot, $b$, in a movable cylindrical plug, E, inserted in the tube C. In the inner end of the slot $b$ are half screw-threads, fitting the threads on the screw D, and the plug is forced outward, so that the threads will mesh by means of a spiral spring, $d$, placed in the inner end of the tube C. The inner end of the plug is provided with a tenon, fitting within the outer end of the spring.

When the clamp is fastened, or when at any other time it is desired quickly to increase the distance between the jaws of the clamp, it is only required to press the plug E inward, so that the threads in its slot $b$ disengage from the screw D, when said screw will drop down of its own weight. G represents the head or jaw, attached to the screw D by means of a swivel ball-and-socket-joint in the following manner: $f$ represents the ball, provided with a recess, $m$, of suitable diameter, extending from one side to and beyond the center of the ball, and from the bottom of this recess is made a hole through the opposite side of the ball. Upon the end of the screw D is formed a pin or tenon, $e$, which is passed through the hole in the ball, and the end thereof upset in a countersink formed around the inner end of said hole in the bottom of the recess $m$, thereby preventing the ball from coming off from the pin, but allowing it, nevertheless, to turn freely thereon. In the recess $m$ in the ball $f$ is inserted a spiral spring, $n$, and in the mouth of the recess is placed a headed pin, $p$, the head of which is curved to correspond with the surface of the ball, and which is pressed outward by the spring $n$. In the under side of the head or jaw G is made a semi-spherical socket, into which the ball $f$ fits. The sides of the head or jaw project beyond this recess, and form a shoulder or offset, $i$. Upon this shoulder is then placed an annular plate or ring, $h$, which confines the ball in the socket, and which may be itself held by a pin, set-screw, or other suitable means. The ring $h$ is put over the end of the screw D before the ball is placed upon the tenon $e$, so as to be inserted in the head after the ball is placed in position thereon. G' represents the upper head or jaw, which is constructed and jointed in the same manner, except that its ball $f'$, upon which it turns, is not swiveled, but cast stationary upon the arm B of the frame; and the ring $h'$, which couples them together, is made in two parts, as shown in Fig. 3, so as to be inserted in the head after the same is placed upon the ball. This ball $f'$ is also recessed, and provided with the interior spiral spring $n$ and headed pin $p$. The object of the spring $n$ and headed pins $p$ is to hold the jaws in any required position by the friction of the head of the pin against the bottom of the recess in the head, caused by the spring pressing said pin outward from the ball.

A clamp constructed in this manner is self-adjusting to the surfaces to which it may be applied, and hence may be used in any place and for any purpose where a clamp may be necessary.

Having thus fully described our invention, what we claim as new, and desire to secure by Letters Patent, is—

1. The combination of the frame A, screw D, nut E, provided with slot $b$, and spring $d$, when all the parts are constructed and operated in the manner and for the purpose shown and described.

2. The combination of the screw D, ball $f$, jaw G, ring $h$, spring $n$, and headed pin $p$, substantially as and for the purpose specified.

3. The combination of the frame A, provided with the ball $f'$, cast stationary thereon, with the socket-jaw G', plate or ring $h'$, spring $n$, and pin $p$, substantially as shown and described.

In testimony that we claim the foregoing as our invention we hereunto affix our signatures this 3d day of April, 1874.

ALBERT R. SILVER.
EDWARD W. FAWCETT.

Witnesses:
ALBERT E. BONSALL,
PETER AMBLER.